April 15, 1924.

B. F. SCHMIDT 1,490,487

CAMERA FOR AERIAL PHOTOGRAPHY

Filed April 19, 1921

INVENTOR.
B. F. Schmidt
BY
ATTORNEY

Patented Apr. 15, 1924.

1,490,487

UNITED STATES PATENT OFFICE.

BENJAMIN F. SCHMIDT, OF LOS ANGELES, CALIFORNIA.

CAMERA FOR AERIAL PHOTOGRAPHY.

Application filed April 19, 1921. Serial No. 462,761.

*To all whom it may concern:*

Be it known that I, BENJAMIN F. SCHMIDT, a citizen of the United States, residing at Los Angeles, county of Los Angeles, State of California, have invented certain new and useful Improvements in Cameras for Aerial Photography; and I do declare the following to be a full, clear, and exact description of the same, reference being had to the accompanying drawings, and to the characters of reference marked thereon, which form a part of this application.

This invention relates to improvements in cameras and particularly to a type used in aerial photography, by which is meant photographing from an aeroplane, balloon or other similar device.

The principal object of my invention is to provide a camera, in connection with any desired data giving devices, by means of which, besides the landscape or other photograph taken, the film or plate will show thereon the readings of the data giving devices at the instant the photograph is taken.

These devices are such as a compass, speedometer, gradometer or elevation indicator, wind-speed indicator, aneroid barometer, an ordinary time piece, and any such instruments of a like nature with which modern aircraft may be equipped, and any or all of the dials of such instruments may be arranged to have their facsimiles show on the photographic plate.

A photograph taken in the air may therefore show conclusively the direction toward which it was taken, the time of day, the elevation of the ship, and other data of a similar nature, without leaving anything to the memory of the photographer as regards such details.

Such a device should therefore prove of inestimable value to all who have occasion to take and make use of photographs taken from the air, since valuable data is thus had which would otherwise be hard or impossible to acquire, or which would be dependent on the memory of the photographer.

In wartime for instance, aeroplane photography is now a well established branch of the military or naval forces. At the same time, aeroplanes doing such work are very often harassed by enemy planes and must fly first one way and then the other to out-manœuver the enemy. The photographer must therefore work at a considerable disadvantage, and cannot always be expected to know in just what direction he is pointing his camera, or to remember the fact afterwards even if he does know at the time. A plate taken with my camera however will unerringly show the direction, and any other data which may prove of value.

Such a camera however would have its uses when taking pictures from the ground, as on surveying or scientific parties, when the direction toward which the photographer was looking, the elevation at which he stood and other data would prove to be of value.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 2:
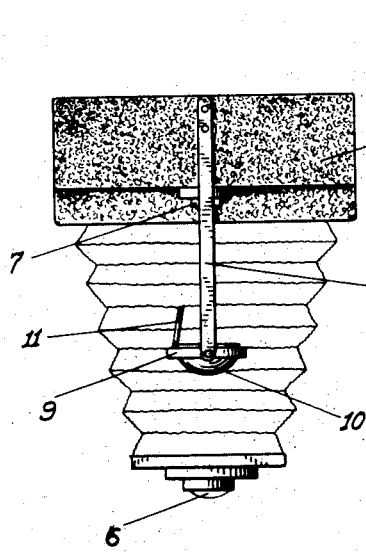
Fig. 2 is a side view of the camera the same being positioned with its lenses horizontal and pointed downwardly.

Referring now more particularly to the characters of reference on the drawings, the numeral 1 denotes the camera box of any desired construction having mounted at the back thereof a sensitized film or plate 2. In the box is an opaque partition 3, extending from the front to a point adjacent the surface of the plate 2 and at right angles thereto. This partition is positioned to divide the camera box into two unequal portions 4 and 5 the latter being by far the smaller, it being emphasized however that the partition extends only to the plate 2, so that a single plate projects across both portions, and is used in common.

At the forward end of the box 1 in central alinement with the portion 4 is a lens structure 6, adjustable by any suitable means to give a varied range of possible focus, as is customary. With this lens the main photograph to be taken is recorded on the plate 2.

At the forward end of the box in central alinement with the portion 5 is fixed lens 7, adjustability of focus being unnecessary, as will be seen.

Fixed to the box and projecting forwardly thereof a suitable distance and on each side of the lens 7 are brackets 8, between which and pivoted thereto at diametrically opposed points is a frame 9, in which is pivotally mounted, at diametrically opposed points, which are in turn positioned at right angles to the pivotal connections of the ring with the brackets, an instrument 10 of any of the various kinds as stated hereinbefore. For convenience and simplicity I have here shown a plain compass, and the mounting thereof just described is a form commonly used with ships' compasses to maintain them in a horizontal position irrespective of the rolling and pitching of the ship, and of course serves in the same manner in the present case, irrespective of the angling of the camera.

In the case of a compass, the north symbol or mark on the bowl must lie in a plane parallel to the axial planes of the lenses 6 and 7. Other instruments, having no connection with direction, may be mounted at random.

Figure 1:
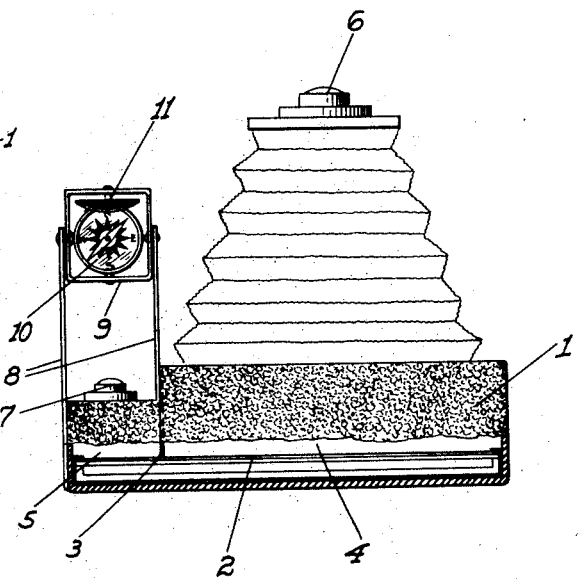
Fig. 1 is a top plan view of the camera showing a compass arranged in connection therewith.
Figure 4:
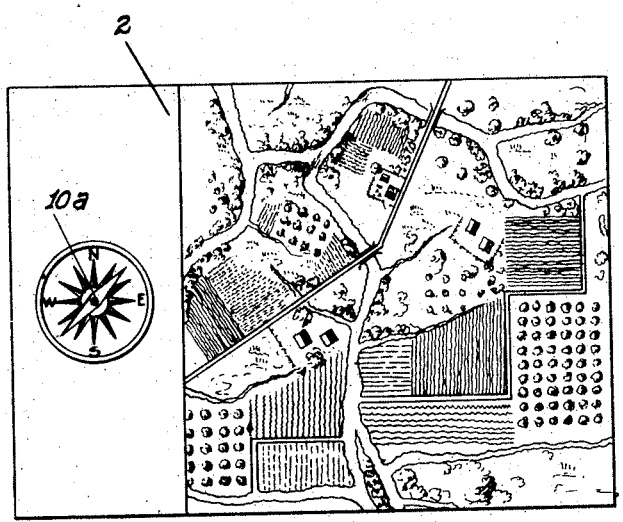
Fig. 4 is a plan of a photographic print showing the results obtained.

Mounted on the forward edge of the bowl 10 is a mirror 11, set at any predetermined angle relative to the face of the bowl. The purposes of the mirror is this:—When the camera is pointing directly downwards, as shown in Fig. 2, and which is the most common position, the compass is then directly ahead of the lens 7, and the compass being always horizontal, the dial or card 10* is then parallel to the lens and is preferably mounted with the frame and brackets to lie substantially concentric therewith. Now as the camera is moved so that it lies parallel with the ground, as shown in Fig. 1, the outside of the bowl 10 only will be reproduced on the photographic plate, and the important feature, the card or dial 10* will be hidden.

Figure 3:
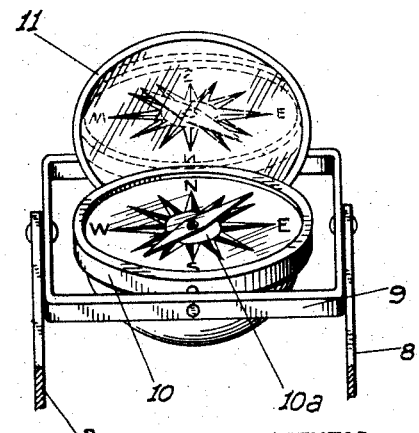
Fig. 3 is a detached view of a compass and reflector mounted in connection therewith.

With the mirror mounted ahead of the instrument however, the reflection of the dial will be plainly visible therein, as seen from Fig. 3, and the plate when exposed will show the reflected image.

The necessary shutter mechanism for the two lenses are of course actuated simultaneously. A mechanism for this purpose can be and has been worked out for stereoscopic and other cameras and forms no part of my invention.

Also it will be evident that while I have shown and described a single instrument to be recorded on the plate, as many more may be grouped within range of the lens 7 as it may be desired to record. Since these instruments are always at a fixed distance from this lens, the focus thereof need never be changed once it is set to record the image in clear and sharp outline.

The main lens 6 is preferably positioned ahead of the instrument 10 so that this lens will not record the instrument, which would be badly out of focus for said lens.

I have herein described and shown only one lens 7, for use with any number of instruments. It may be found necessary however to use a lens for each such instrument, and I therefore reserve the right to do so.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a camera adapted to contain a sensitized element, spaced lenses for recording images on the same side of the element in spaced relation, data-giving means positioned directly ahead of one of the lenses and hung in a fixed plane and means whereby said data giving means will be recorded on the element irrespective of the horizontal alinement and angular setting of the camera with respect to said data giving means.

2. In a camera adapted to contain a sensitized element, independent lenses for recording spaced and independent images thereon, data giving means hung in a fixed plane and within focal range of one of said lenses, and means whereby said data giving means will be recorded on the element irrespective of the angular setting of the camera with respect to said data giving means.

3. In a camera adapted to contain a sensitized element, independent lenses for recording spaced and independent images thereon, data giving means hung in a fixed plane and within focal range of one of said lenses and a mirror fixed with said means and set at an angle to the face thereof ahead of and in a plane parallel to the corresponding lens.

4. In a camera adapted to contain a sensitized element, independent lenses for recording spaced and independent images thereon, data giving means hung in a fixed plane and within focal range of one of said lenses and reflecting means mounted in fixed connection with the data giving means for placing a reflected image of the face thereof in position to be photographed by the corresponding lens with certain settings of the latter.

5. In a camera, a lens, a data giving instrument mounted ahead of said lens in the focal range thereof and hung to maintain its dial in a constant plane, and means for enabling the image of said dial to be photographed irrespective of the angular setting of the camera.

6. In a camera, a lens, supports fixed to the camera and projecting ahead of the lens, a frame hung therein for swinging movement about a fixed axis, an instrument hung in the frame for swinging movement about an axis oppositely disposed to the first named axis, and reflecting means mounted with the instrument above the dial thereof and at an angle thereto.

In testimony whereof I affix my signature.

BENJAMIN F. SCHMIDT.